US012114413B2

(12) United States Patent
Wu et al.

(10) Patent No.: US 12,114,413 B2
(45) Date of Patent: Oct. 8, 2024

(54) CONNECTOR IN A PLASMA ARC TORCH SYSTEM

(71) Applicant: Hypertherm, Inc., Hanover, NH (US)

(72) Inventors: Jing Wu, Etna, NH (US); Jesse A. Roberts, Cornish, NH (US)

(73) Assignee: Hypertherm, Inc., Hanover, NH (US)

( * ) Notice: Subject to any disclaimer, the term of this patent is extended or adjusted under 35 U.S.C. 154(b) by 754 days.

(21) Appl. No.: 16/567,432

(22) Filed: Sep. 11, 2019

(65) Prior Publication Data

US 2020/0281066 A1    Sep. 3, 2020

Related U.S. Application Data

(60) Provisional application No. 62/729,540, filed on Sep. 11, 2018.

(51) Int. Cl.
*H05H 1/36* (2006.01)
*B23K 10/00* (2006.01)
(Continued)

(52) U.S. Cl.
CPC ............ *H05H 1/36* (2013.01); *B23K 10/006* (2013.01); *H05H 1/28* (2013.01); *H05H 1/3423* (2021.05)

(58) Field of Classification Search
CPC ........ B23K 10/00; B23K 10/006; H05H 1/28; H05H 1/34; H05H 1/3473; H05H 1/3478; H05H 1/36
See application file for complete search history.

(56) References Cited

U.S. PATENT DOCUMENTS

| 5,074,802 A | 12/1991 | Gratziani et al. |
| 5,208,436 A * | 5/1993 | Blankenship ............ H05H 1/36 219/121.54 |

(Continued)

FOREIGN PATENT DOCUMENTS

| AT | 11 800 U1 | 5/2011 |
| CN | 1774312 A | 5/2006 |

(Continued)

OTHER PUBLICATIONS

Chinese Search Report for Chinese Application No. 201980074018.7 dated Dec. 27, 2023, pp. 1-3.

(Continued)

*Primary Examiner* — Nathaniel E Wiehe
*Assistant Examiner* — Frederick F Calvetti
(74) *Attorney, Agent, or Firm* — Cesari and McKenna, LLP

(57) ABSTRACT

A lead connector is provided for connecting a plasma torch lead of a plasma arc torch to a power supply of a plasma cutting system. The lead connector includes a base portion, a central conduit disposed in the base portion, where the central conduit is configured to carry a gas and a torch current to the plasma arc torch, and multiple pins disposed radially about a center of the central conduit. The pins are located at a radius of between about 0.4 inches and about 0.65 inches from the center of the central conduit on a radial plane of the base portion. The pins include one or more pilot carrying pins and one or more control signal pins located from about 27 degrees to about 64 degrees and from about 120 degrees to about 170 degrees, respectively, about the center of the central conduit on the radial plane.

36 Claims, 7 Drawing Sheets

(51) Int. Cl.
*H05H 1/28* (2006.01)
*H05H 1/34* (2006.01)

(56) References Cited

U.S. PATENT DOCUMENTS

| | | | |
|---|---|---|---|
| 6,472,631 B1 | 10/2002 | Eickhoff et al. | |
| 6,683,273 B2* | 1/2004 | Conway | H01R 13/005 |
| | | | 219/121.48 |
| 6,852,943 B2 | 2/2005 | Eickhoff et al. | |
| 7,762,830 B2* | 7/2010 | Roberts | B23K 9/324 |
| | | | 439/350 |
| 2003/0100208 A1 | 5/2003 | Conway et al. | |
| 2004/0089639 A1* | 5/2004 | Raymond | F16L 57/02 |
| | | | 219/121.48 |
| 2005/0067396 A1* | 3/2005 | Kaufman | B23K 1/0008 |
| | | | 219/137.71 |
| 2009/0212027 A1* | 8/2009 | Borowy | B23K 15/0026 |
| | | | 219/121.48 |
| 2009/0215302 A1* | 8/2009 | Roberts | B23K 10/00 |
| | | | 439/350 |
| 2017/0169995 A1 | 6/2017 | Kim et al. | |
| 2017/0187158 A1* | 6/2017 | Crowe | B23K 9/323 |
| 2018/0169783 A1 | 6/2018 | Beliveau | |
| 2018/0206322 A1 | 7/2018 | Wu et al. | |

FOREIGN PATENT DOCUMENTS

| | | |
|---|---|---|
| CN | 101715378 A | 5/2010 |
| CN | 107852809 A | 3/2018 |
| WO | 03/041459 A2 | 5/2003 |
| WO | 2009/105386 A1 | 8/2009 |
| WO | 2009105511 A2 | 8/2009 |
| WO | 2017/021849 A1 | 2/2017 |
| WO | WO2017/021849 * | 2/2017 |

OTHER PUBLICATIONS

English Translation of Chinese Search Report for Chinese Application No. 201980074018.7 dated Dec. 27, 2023, pp. 1-3.

* cited by examiner

600

```
┌─────────────────────────────────────────────┐
│ Dispose one or more pilot carrying pins     │
│ radially at about 0 degrees to about 90     │ 602
│ degrees about a center of the central       │
│ conduit on a radial plane of the base       │
│ portion                                     │
└─────────────────────────────────────────────┘
                      │
┌─────────────────────────────────────────────┐
│ Dispose one or more remaining pins radially │
│ at about 90 degrees to about 360 degrees    │ 604
│ about the center of the central conduit on  │
│ the radial plane of the base portion        │
└─────────────────────────────────────────────┘
                      │
┌─────────────────────────────────────────────┐
│ Radially space the pilot carrying pins and  │
│ the remaining pins such that a distance     │ 606
│ between a pair of the pilot carrying pins   │
│ is greater than a distance between a pair   │
│ of the remaining pins                       │
└─────────────────────────────────────────────┘
```

FIG. 8

CONNECTOR IN A PLASMA ARC TORCH SYSTEM

CROSS REFERENCE TO RELATED APPLICATION

This application claims the benefit of and priority to U.S. Provisional Patent Application No. 62/729,540, filed Sep. 11, 2018, the entire contents of which are owned by the assignee of the instant application and incorporated herein by reference in their entirety.

TECHNICAL FIELD

The present invention generally relates to a quick connect and disconnect connector assembly for a plasma arc torch system.

BACKGROUND

Thermal processing torches, such as plasma arc torches, are widely used in the heating, cutting, gouging and marking of materials. A plasma arc torch generally includes an electrode, a nozzle having a central exit orifice mounted within a torch body, electrical connections, passages for cooling, and passages for arc control fluids (e.g., plasma gas). Optionally, a swirl ring is employed to control fluid flow patterns in the plasma chamber formed between the electrode and the nozzle. In some torches, a retaining cap can be used to maintain the nozzle and/or swirl ring in the plasma arc torch. In operation, the torch produces a plasma arc, which is a constricted jet of an ionized gas with high temperature and sufficient momentum to assist with removal of molten metal.

A connector assembly is generally used to couple a thermal processing torch (e.g., a plasma arc torch) via one or more leads to an operating system (e.g., a power/gas supply of a plasma arc system), which is configured to provide fluids, signals and/or power to the torch to support a desired torch operation. Because plasma arc systems are usable in a variety of applications and processes across a variety of environments, different torches and/or leads may be needed to support the different applications and processes. Thus, torches and/or leads need to be quickly connected and disconnected from the plasma arc system for easy replacement while avoiding long periods of downtime and maintaining reliable leak free connections for power, fluids and signals.

Even though connections that enable quick torch connect and disconnect relative to power supplies exist in today's market, they present challenges in operation, including creating signal noise issues, unwanted pressure drops, improper torch-to-power-supply connections, and less than desirable creepage and clearance between power and signal wires. Further, the pin arrangements in the existing connection designs limit torch functionality and expansion opportunities because these designs do not have space to accommodate additional pins supporting, for example, radiofrequency identification (RFID) communication, additional pilot current flow, increased power supply, additional gas control functions, torch height control and lead length indexing between the power supply and the torch. Existing connection designs also do not have pins with increased diameters for larger and more varied power ranges and signals.

Thus, there is a need for connector assembly designs that remedy these deficiencies while supporting quick connect and disconnect of a plasma arc torch from a plasma arc system. Specifically, there is a need for a connector assembly design that accommodates more pins to convey additional communication signals between a plasma arc torch and a plasma arc system while maintaining signal insulation and signal integrity among the pins.

SUMMARY

The present invention provides various designs for a connector assembly that creates a quick disconnect system with signal and fluid ports. The connector assembly also offers more operational capabilities, meets stricter design requirements, and includes optimized spacing and orientation to accommodate additional and/or varied pins and signals without creating interference or comprising the integrity of the connection. For example, the connector assembly of the present invention prevents noise interference and improper installations and/or connections, reduces pressure drops, and improves robustness of the connections. In some embodiments, such a torch assembly includes a single retention mechanism for quick connect and disconnect. In some embodiments, the torch assembly divides the pins into zones of like pins that are circumferentially spaced relative to one another to maximize creepage distance, thus reducing current creepage in a confined space. In some embodiments, the torch assembly includes blades and other hindrance structures to provide further insulation among the zones.

The invention, in one aspect, features a lead connector for connecting a plasma torch lead of a plasma arc torch to a power supply of a plasma cutting system. The lead connector includes a base portion and a central conduit disposed in the base portion, where the central conduit is configured to carry a gas and a torch current to the plasma arc torch. The lead connector also includes a plurality of pins disposed radially about a center of the central conduit. The plurality of pins located at a radius of between about 0.4 inches and about 0.65 inches from the center of the central conduit on a radial plane of the base portion. The plurality of pins include one or more pilot carrying pins configured to carry a pilot current to the plasma arc torch. The one or more pilot carrying pins are located from about 27 degrees to about 64 degrees about the center of the central conduit on the radial plane. The plurality of pins also include one or more control signal pins radially disposed from about 120 degrees to about 170 degrees about the center of the central conduit on the radial plane. The one or more control signal pins include at least one of a start pin configured to generate a start signal for operating the torch or a consumable sensing pin configured to generate a detection signal for sensing installation of a consumable in the torch. An angular spacing between each of the pilot carrying pins and a closest of the control signal pins is about 66 degrees or greater such that a current creepage is reduced between the pilot carrying pins and the closest of the control signal pins.

In another aspect, the present invention features lead connector for connecting a plasma torch lead of a plasma arc torch to a power supply of a plasma cutting system, the lead connector includes a base portion and a central conduit disposed in the base portion, where the central conduit is configured to carry a gas and a torch current to the plasma arc torch. The lead connector also includes a plurality of pins disposed radially about a center of the central conduit. The plurality of pins are located at a radius of between about 0.4 inches and about 0.65 inches from the center of the central conduit on a radial plane of the base portion. The plurality of pins include one or more pilot carrying pins radially disposed at the radius about the center of the central conduit on the radial plane. The one or more pilot carrying pins are configured to carry a pilot current to the plasma arc torch. The plurality of pins also include one or more control signal pins radially disposed at the radius about the center of the central conduit on the radial plane. The one or more control signal pins include a start pin for generating a start signal to operate the torch. An angular spacing between a pilot carrying pin and a closest of the control signal pins is not more than about 103 degrees when measured with respect to the central conduit, while a creepage distance between the pilot carrying pin and the closest control signal pin is greater than or equal to about 12.6 mm.

In yet another aspect, the present invention features a connector for a plasma cutting system including a plasma power supply and a plasma arc torch. The connector includes a base portion and a central conduit disposed in the base portion, where the central conduit is configured to carry a gas and a torch current to the plasma arc torch of the plasma cutting system. The connector also includes a plurality of pins disposed radially about the central conduit on a radial plane of the base portion. The plurality of pins are divided into a set of distinct circumferential zones about the central conduit. The set of distinct circumferential zones include a first zone located in a first quadrant on the radial plane of the base portion. The first zone includes one or more pilot carrying pins configured to conduct a pilot current to the plasma arc torch. The set of distinct circumferential zones also include a second zone located in a second through a fourth quadrant on the radial plane of the base portion. The second zone includes a start pin configured to generate a start signal for operating the torch. A distance between a pair of the pins in the first zone is greater than a distance between a pair of the pins in the second zone.

In some embodiments, each of a first pin and a last pin of the second zone is spaced radially at least 0.3 inches in arc length from respective adjacent pins of the first zone.

In some embodiments, the connector further includes a means for insulating the one or more pins in the second zone from the one or more pilot carrying pins in the first zone to decrease a current creepage from the pilot carrying pins to the pins in the second zone.

In yet another aspect, the present invention features a method of manufacturing a connector for a plasma cutting system. The connector comprises a base portion and a central conduit disposed in the base portion for carrying a gas and a torch current to a plasma arc torch of the plasma cutting system. The method includes disposing one or more pilot carrying pins radially at about 0 degrees to about 90 degrees about a center of the central conduit on a radial plane of the base portion, where the pilot carrying pins are configured to carry a pilot current to the plasma arc torch. The method also includes disposing one or more remaining pins radially at about 90 degrees to about 360 degrees about the center of the central conduit on the radial plane of the base portion, where the remaining pins include a start pin configured to generate a start signal for operating the torch. The method further includes radially spacing the pilot carrying pins and the remaining pins such that a distance between a pair of the pilot carrying pins is greater than a distance between a pair of the remaining pins.

In some embodiments, the method further includes inserting one or more insulative blades between the one or more pilot carrying pins and the one or more remaining pins to reduce creepage of the pilot current from the pilot carrying pins to the remaining pins.

In some embodiments, the method further includes disposing each of the one or more pilot carrying pins and the one or more remaining pins at a radius of between about 0.4 inches and about 0.65 inches from the center of the central conduit on the radial plane of the base portion.

Any of the above aspects can include one or more of the following features. In some embodiments, a line of sight spacing between a pilot carry pin and the closest of the control signal pins is about 0.6 inches. In some embodiments, the closest control signal pin comprises the consumable sensing pin. In some embodiments, a smallest angular spacing between the one or more pilot carrying pins and the one or more control signal pins is about 60 degrees. In some embodiments, a largest angular spacing between the one or more pilot carrying pins and the one or more control signal pins is about 140 degrees. In some embodiments, the one or more control signal pins further includes a power pin configured to provide voltage to the one or more control signal pins and power to a control board of the plasm arc torch.

In some embodiments, the reduced current creepage is further achieved using at least one of a first insulative blade disposed at about 80 degrees or a second insulative blade disposed at about 95 degrees about the center of the central conduit on the radial plane. The first or second insulative blade can be located radially between a pilot carrying pin and a control signal pin.

In some embodiments, each of the pilot carrying pins maintains an arc length distance of about 0.05 inches (e.g., about 0.046 inches) from an adjacent pilot carrying pin. In some embodiments, each of the control signal pins maintains an arc length distance of about 0.03 inches from an adjacent control signal pin. In some embodiments, an arc length between a pair of the pilot carrying pins is greater than an arc length between a pair of the control signal pins.

In some embodiments, the lead connector further comprises a key feature disposed at about 0 degrees about the center of the central conduit on the radial plane. The key feature is configured to matingly engage a key feature of a corresponding connector of a plasma power supply. The key feature can comprise at least two axial steps of the base portion shaped to identify the corresponding connector of the power supply.

In some embodiments, the plurality of pins further includes a plurality of data communication pins disposed radially from about 180 degrees to about 214 degrees about the opening of the central conduit on the radial plane. The plurality of data communication pins are configured to communicate data between the plasma arc torch and the power supply. In some embodiments, the plurality of pins further includes an identification pin disposed radially at about 230 degrees about the opening of the central conduit on the radial plane. The identification pin is configured to signal whether the torch is a mechanized torch or a handheld torch. In some embodiments, the plurality of pins further includes a plurality of length identification pins disposed radially from about 240 to about 300 degrees about the opening of the central conduit on the radial plane. The plurality of length identification pins configured to signal to the power supply a length of the plasma torch lead.

In some embodiments, the start pin is located about 147 degrees about the center of the central conduit on the radial plane. The start pin can be located between about 80 degrees and about 120 degrees from a closest of the pilot carrying pins. In some embodiments, the consumable sensing pin is located about 130 degrees about the center of the central conduit on the radial plane. In some embodiments, the one or more pilot carrying pins is located about 0 degrees to about 90 degrees about the center of the central conduit on the radial plane. For example, the one or more pilot carrying pins are located from about 20 degrees to about 70 degrees about the center of the conduit on the radial plane. In some embodiments, the one or more control signal pins are located from about 120 degrees to about 170 degrees about the center of the conduit on the radial plane.

In some embodiments, the plasma cutting system comprises an air cooled plasma cutting system. In some embodiments, the plurality of pins are located at a radius of about 0.55 inches from the center of the central conduit on the radial plane.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

FIG. 8 shows an exemplary method for manufacturing the lead connector of the connector assembly of FIG. 1, according to some embodiments of the present invention.

DETAILED DESCRIPTION

Figure 1:
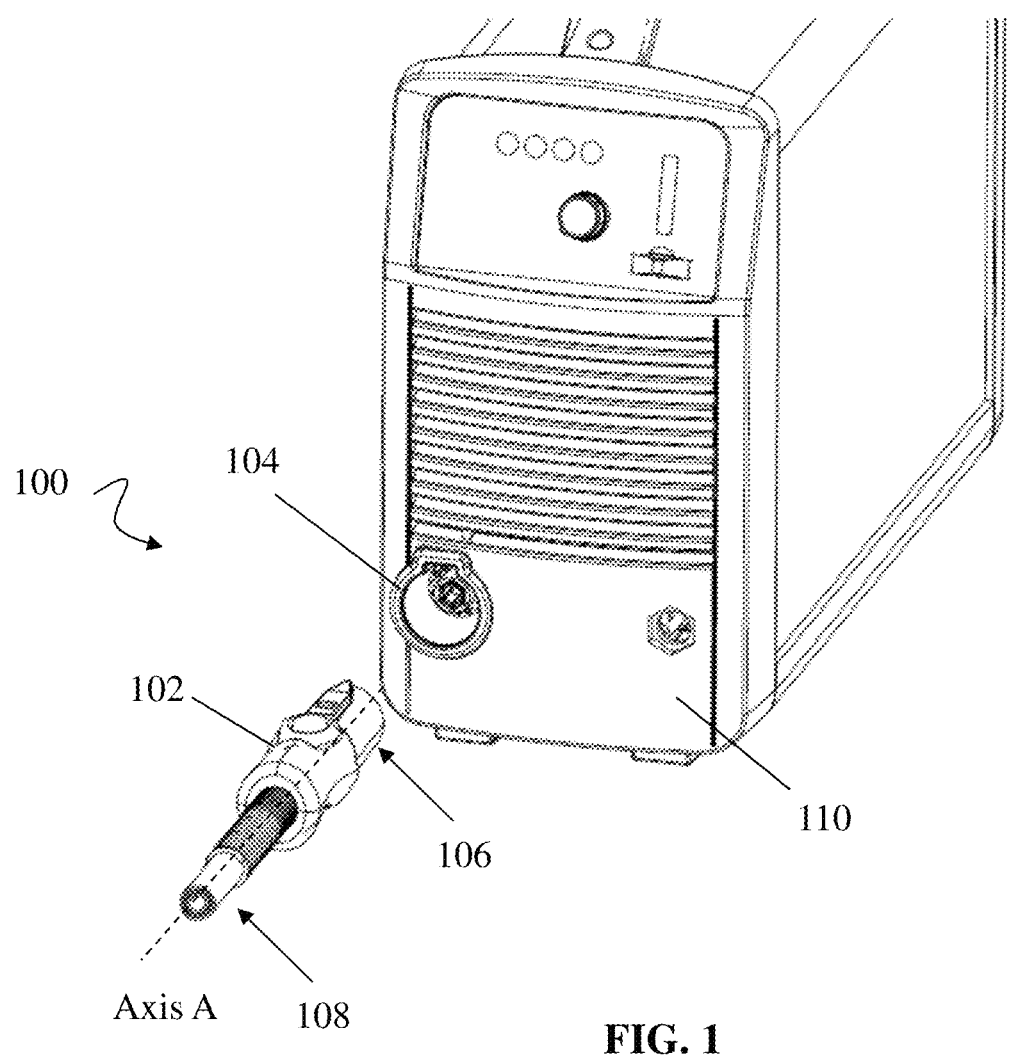
FIG. 1 shows a connector assembly of a plasma arc cutting system that includes a lead connector and a corresponding connector receptacle, according to some embodiments of the present invention.

FIG. 1 shows a connector assembly 100 for a plasma arc cutting system that includes a lead connector 102 and a corresponding connector receptacle 104, according to some embodiments of the present invention. The lead connector 102 has a proximal end 106 and a distal end 108 defining a longitudinal axis A extending therethrough. The proximal end 106 of the lead connector 102 is configured to mate with the connector receptacle 104. In some embodiments, the connector receptacle 104 is a socket disposed on a power and/or gas supply 110 of the plasma arc cutting system. The distal end 108 of the lead connector 102 is configured to couple to a plasma arc torch (not shown) via one or more leads (not shown). Thus, upon a mating engagement with the connector receptacle 104, the lead connector 102 can connect a plasma torch lead of a plasma arc torch to a power supply of the plasma arc cutting system. The lead connector 102, in conjunction with the connector receptacle 104, convey fluids, signals and/or power to the plasma arc torch. The lead connector 102 can disengage from the connector receptacle 104 with a quick actuation movement, as described in detail below. In some embodiments, the plasma arc cutting system, which comprises the connector assembly 100, the plasma arc torch and the power/gas supply 110, is air cooled.

Figure 2A:
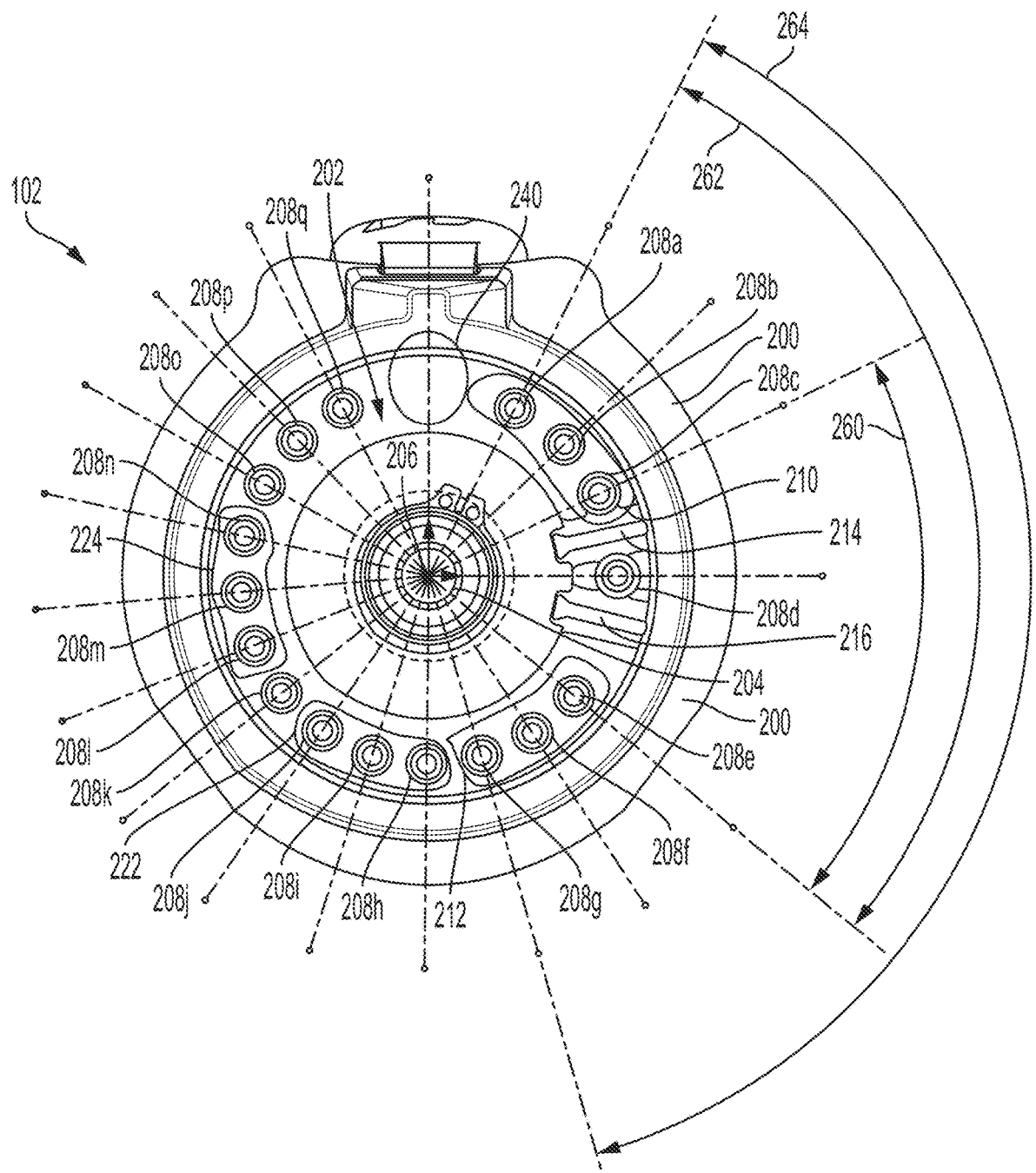
FIGS. 2a and 2b show an end view and a perspective view, respectively, of the proximal end of the lead connector of the connector assembly of FIG. 1, according to some embodiments of the present invention.
Figure 2B:
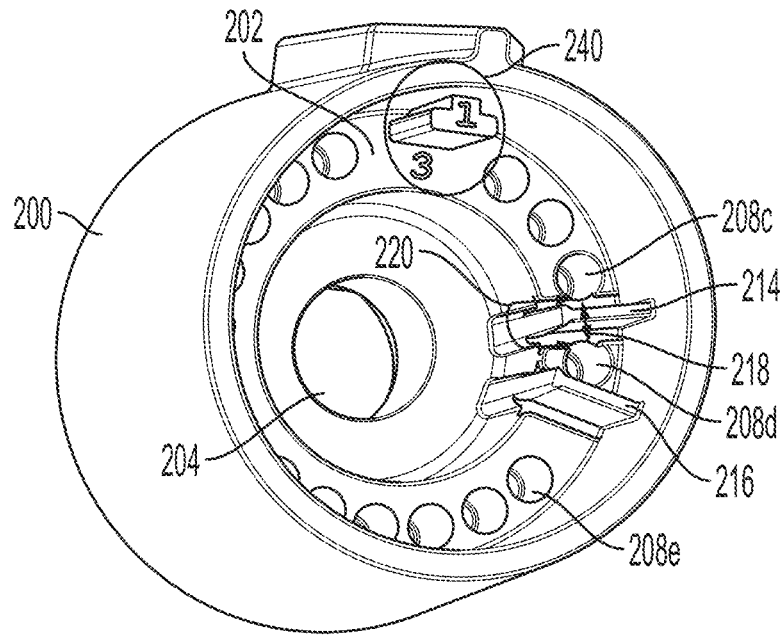

FIGS. 2a and 2b show an end view and a perspective view, respectively, of the proximal end 106 of the lead connector 102 of the connector assembly 100 of FIG. 1, according to some embodiments of the present invention. As shown, the lead connector 102 includes a base portion 200 disposed at the proximal end 106 of the lead connector 102, where the base portion 200 defines a radial plane 202 that is substantially perpendicular to the longitudinal axis A of the lead connector 102. In some embodiments, the radial plane 202 is substantially circular. The lead connector 102 also includes a central conduit disposed in the base portion 200 such that an opening 204 of the central conduit is located on the radial plane 202 and exposed at the proximal end 106. The central conduit opening 204, which is located at the center 206 of the radial plane 202, is configured to direct a gas and/or carry an electrical current (e.g., main power current) from the power and/or gas supply 110 to the plasma arc torch. Further, the lead connector 102 includes multiple ports (collectively numbered 208), such as in the form of protruding pins, disposed radially around the central conduit opening 204 on the radial plane 202 to convey various types of signals between the torch and the power/gas supply 110. Each of these pins 208 is generally located off-centered, non-concentric, and non-symmetrical relative to the center 206 of the radial plane 202. The orientation and spacing of the various pins 208 are tailored to the corresponding signals or fluids conveyed.

In some embodiments, the multiple pins 208 include a zone 210 of one or more pilot carrying pins, such as three pilot carrying pins 208a-c illustrated in FIGS. 2a and b, generally disposed in the first quadrant (i.e., 0 to about 90 degrees) of the radial plane 202 about the center 206. In the context of the present application, angle measurements described herein are about the center 206 of the radial plane 202 and clockwise in relation to a reference point (i.e., 0 degree), which can be where one or more key features 240 are located. The pilot carrying pins 208a-c can be located from about 20 degrees to about 70 degrees about the center 206 (e.g., about 27 degrees to about 64 degrees), where the first pilot carrying pin 208a is at about 27 degrees, the second pilot carrying pin 208b is at about 46 degrees and the third pilot carrying pin 208c is at about 64 degrees. Even though three pilot carrying pins 208a-c are shown in FIGS. 2a and b, there can be more or fewer pilot carrying pins, such as one pilot carrying pin or two pilot carrying pins with the second pin as a backup. Each of these pilot carrying pins 208a-c is configured to carry a pilot current from the power/gas supply 110 to the plasma arc torch.

In some embodiments, the remaining pins 208, which are the pins located in the second through fourth quadrants of the radial plane 202, include a zone 212 of one or more control signal pins. For example, the zone 212 can include three control signal pins 208e-g, configured to convey various control signals from the power/gas supply 110 to the plasma arc torch to control different aspects of operating the torch. Specifically, the zone 212 of control signal pins can include a cap sense switch pin 208e adapted to convey to the power/gas supply 110 an electrical signal if installation of a consumable in the torch is sensed. The zone 212 of control signal pins can also include a start pin 208f configured to convey a start signal to the power/gas supply 110 for commencing operation of the torch if an operator activates a trigger on the torch. The zone 212 of control signal pins can further include a power pin 208g configured to provide voltage (e.g., 18V) from the power/gas supply 110 to the zone 212 of control signal pins and to a control board (not shown) of the plasm arc torch configured to provide communication between the attached plasma arc torch and a digital signal processing board of the power supply 110, detect the presence of one or more consumables in the torch, provide plasma arc current adjustment, display the status of operating parameters (e.g., current level and torch operation status and warnings) and execute user controls (e.g., disable control). In some embodiments, the zone 212 of control signal pins are generally disposed in the second quadrant (i.e., 90 to 180 degrees) of the radial plane 202 about the center 206 of the radial plane 202. For example, they can be radially located from about 120 degrees to about 170 degrees about the center 206, where the cap sense switch pin 208e is at about 130 degrees, the start pin 208f is at about 147 degrees, and the power pin 208g is at about 164 degrees. In some embodiments, the start pin 208f is located between about 80 degrees and about 120 degrees from the radially closest pilot carrying pin (e.g., pilot carrying pin 208c).

In some embodiments, the remaining pins 208 include a torch height adjustment pin 208d located on the radial plane 202 radially between the zone 210 of pilot carrying pins and the zone 212 of control signal pins, but is not a part of the zone 210 of pilot carrying pins or the zone 212 of control signal pins. For example, the torch height adjustment pin 208d can be located at about 90 degrees on the radial plane 202. This pin 208d is configured to perform CNC height control if the lead connector 102 connects a mechanized torch to the plasma arc cutting system. The torch height adjustment pin 208d can measure the arc voltage (or resistance) from the ohmic contact attached to the processing head of the attached torch to the workpiece and automatically send signals to the power supply 110 to adjust the height for optimal cutting performance regardless of the workpiece material variations.

In some embodiments, the remaining pins 208 include a zone 222 of one or more data communication pins 208h-j, configured to communicate different types of data between the plasma arc torch and the power/gas supply 110. The zone 222 of data communication pins radially span from about 180 degrees to about 214 degrees about the center 206 of the radial plane 202. Specifically, the data communication pins can include two communication lines 208i, 208j, located at about 198 degrees and about 214 degrees, respectively, configured to provide RS-485 serial communication, and a ground pin 208h, located at about 180 degrees, configured to provide a reference ground for the communication pins 208i and 208j.

In some embodiments, the remaining pins 208 include a torch identification pin 208k disposed radially at about 230 degrees about the center 206 of the radial plane 202 adjacent to the zone 222 of data communication pins. The torch identification pin 208k is configured to signal to the power and/or gas supply 110 whether the torch connected is a mechanized torch or a handheld torch. In some embodiments, the remaining pins 208 further include a zone 224 of one or more length identification pins disposed radially from about 240 degrees to about 300 degrees about the center 206 of the radial plane 202. As shown in FIG. 2a, the length identification pins can comprise three pins 208l, 208m, 208n, each configured to signal to the power/gas supply 110 a length of the plasma torch lead. In some embodiments, multiple length identification pins are used for generating various combinations of numbers that correspond to various lead lengths. For example if two length identification pins are used, the binary codes 0-0, 0-1 and 1-1 generated by these two pins represent different lead lengths. Therefore, even more lead lengths can be identified with the usage of three pins. In some embodiments, the remaining pins 208 further include one or more spare pins for future communication expansion usage. For example, as shown in FIG. 2a, three spare pins 208o, 208p, 208q are located adjacent to the zone 224 of length identification pins. These three spare pins 208o, 208p, 208q can be located at about 300 degrees, 316 degrees and 333 degrees, respectively, about the center 206 of the radian plane 202.

In another aspect, the radial arrangement of the zone 210 of pilot carrying pins relative to the remaining pins 208 is optimized to reduce current creepage. In the context of the present invention, current creepage is defined as the leakage of an electrical current across the surface of an insulator (e.g., across the radial plane 202 of the base portion 200) between two conductive parts (e.g., between two pins). Such a leakage current can establish a short circuit across a gap between two pins. Thus, a creepage distance between the pins needs to be sufficiently large (e.g., in compliance with the pertinent industry standard, such as IEC 50974-1 ED5) to prevent short circuiting, thereby safeguarding operator safety. Specifically, because the pilot carrying pins of zone 210 are configured to conduct high current, measures need to be taken to minimize creepage of the pilot current to the surrounding pins (i.e., maximize creepage distance). However, this consideration needs to be balanced with the competing consideration to minimize spacing among the pins 208 such that more pins 208 can be located on the radial plane 202 to provide more complex control capabilities.

In some embodiments, to achieve reduced current creepage among the pins 208 in compliance with the industry standard, angular spacing between the zone 210 of pilot carrying pins and the zone 212 of control signal pins is defined. For instance, angular spacing between each of the pilot carrying pins (e.g., pins 208a-c) in the zone 210 and a closest of the control signal pins (e.g., the cap sense switch pin 208e) in the zone 212 is chosen to be about 60 degrees or greater. For example, the smallest angular spacing 260 between the two zones of pins, which is the between the pilot carrying pin 208c at about 64 degrees and the cap sense switch pin 208e at about 130 degrees, is about 66 degrees. In some embodiments, a line of sight spacing between a pilot carrying pin (e.g., one of pins 208a-c) and the closest of the control signal pins (e.g., the cap sense switch pin 208e), which represents a straight line distance across the radial plane 202 between the two pins, is about 0.6 inches or greater, such as 1.2 inches.

In some embodiments, to minimize current creepage among the pins 208 in compliance with the industry standard, a creepage distance of greater than or equal to 12.6 mm is maintained between a pilot carrying pin (i.e., pin 208a, b, or c) and the closest of the remaining pins (e.g., control signal pin 208e). For example, at least one insulative blade can be radially disposed between the zone 210 of pilot carrying pins and the zone 212 of control signal pins about the center 206 of the radial plane 202 to increase the creepage distance without increasing the angular spacing between the two zones. The insulative blade can be constructed from an electrically insulating material that extends longitudinally (i.e., along longitudinal axis A) to form a barrier between the zones. As shown, a first insulative blade 214 is disposed at about 80 degrees about the center 206, immediately between the zone 210 of pilot carrying pins and the torch height adjustment pin 208d. A second insulative blade 216 can be disposed at about 95 degrees about the center 206, immediately between the torch height adjustment pin 208d and the zone 212 of control signal pins. Each of these blades 214, 216 is adapted to increase the creepage distance between the adjacent pins without increasing the angular spacing and arc length distance between them, thus allowing more pins to be accommodated on the radial plane 202. For example, as shown in FIG. 2b, the creepage distance 218 (i.e., the shortest surface travel distance) between the pilot carrying pin 208c and the height control pin 208d without the first insulative blade 214 is shorter than the creepage distance 220 between the two pins 208c, 208d with the first insulative blade 214 in place because the current creepage needs to travel around insulative blade 214 instead of in a straight-lined path. The same principle applies to the function of the second insulative blade 216 in terms of reducing the current creepage and/or increasing the creepage distance between the height control pin 208d and the consumable sensing pin 208e. In some embodiments, the creepage distance between pins 208c and 208d is about 6.3 mm or greater. In some embodiments, the creepage distance between pins 208d and 208e is about 12.6 mm or greater. Thus, the creepage distance between any of the pilot carrying pins 208a-c and the consumable sensing pin 208e is greater than 12.6 mm. In general, the blades 214, 216 serve to enhance insulation between the pilot carrying pins 208a-c in the zone 210, the torch height adjustment pin 208d, and the remaining pins from one other. Further, the insulative blades 214, 216 create three distinct groupings of the communications pins that are spatially and physically separated from one another. The three different groupings comprise the zone 210 of pilot carrying pins 208a-c, the torch height adjustment pin 208d, and the remaining pins 208e-q located in second through fourth quadrants on the radial plane 202 (hereinafter referred to as the "residual zone"). In some embodiments, substantially the same creepage distance can be achieved by strategically arranging the pins without the insulative blades 214, 216 or using only one of the blades 214, 216. For example, substantially the same creepage distance can be achieved by increasing the arc length spacing among the communication pins 208c-e for increased insulation by distance.

In some embodiments, an upper bound on the angular spacing between the pilot carrying pins of zone 210 and the control signal pins of zone 212 is set to maximize the number of pins that can fit on the radial plane 202. The angular spacing between a pilot carrying pin in zone 210 and a closest of the control signal pins in zone 212 can be no more than about 103 degrees when measured with respect to the center 206. For example, the angular spacing 262 between the pilot carrying pin 208a at about 27 degrees and the cap sense switch pin 208e at about 130 degrees is about 103 degrees. In some embodiments, the largest angular spacing between the pilot carrying pins in zone 210 and the control signal pins in zone 212 is no more than about 140 degrees when measured with respect to the center 206. For example, this angular spacing 264, which is between the pilot carrying pin 208a at about 27 degrees and the power pin 208g at about 164 degrees, is about 137 degrees.

Figure 3:
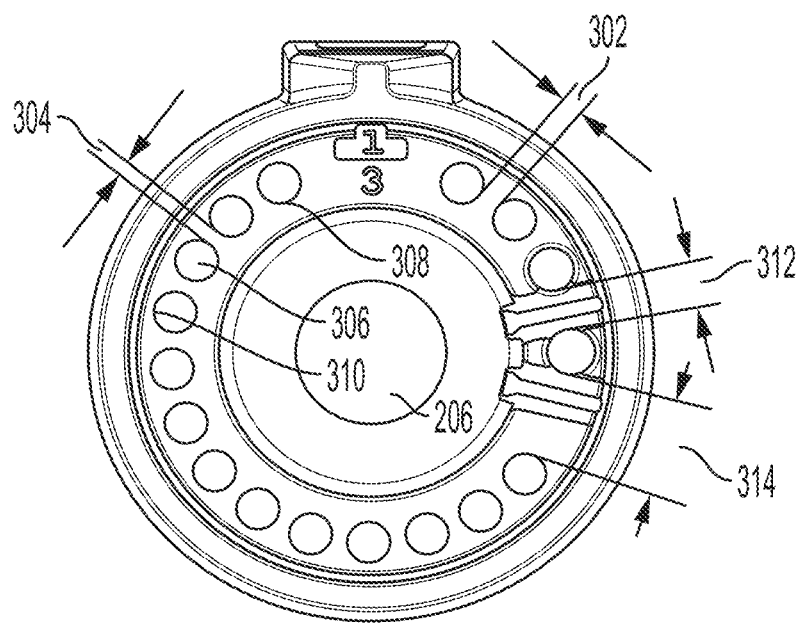
FIG. 3 shows an exemplary spacing arrangement among different features of the lead connector 102 of the connector assembly 100 of FIG. 1, according to some embodiments of the present invention.

FIG. 3 shows an exemplary spacing arrangement among different features of the lead connector 102 of the connector assembly 100 of FIG. 1, according to some embodiments of the present invention. In general, the pins 208 can have non-uniform spacing. For instance, the pins in some zones are more tightly grouped relative to one another in comparison to the pins in other zones, which are more spaced relative to one another. Specifically, the arc length distance between a pair of adjacent pins in one zone can be different than the arc length distance between a pair of adjacent pins in another zone. Such varied distance separates pins of different functions (e.g., pilot arc and ohmic sense contact points, gas supplies and power supply connections) from one another dependent on signal uses and needs.

In some embodiments, an arc length distance between a pair of adjacent pilot carrying pins in the zone 210 can be greater than an arc length distance between a pair of adjacent pins located in the residual zone. For instance, each of the pilot carrying pins in the zone 210 can maintain an arc length distance 302 of about 0.05 inches (e.g., 0.046 inches) from an adjacent pilot carrying pin, while each of the pins in the residual zone maintains an arc length distance 304 of about 0.03 inches from an adjacent pin in the same zone. In some embodiments, a pin of the residual zone (e.g., pin 208e) is spaced at an arc length distance of at least about 0.3 inches from the closest adjacent pilot carrying pin in the zone 210 (e.g., pilot carrying pin 208c). For instance, the arc length distance 312 between the pilot carrying pin 208c and the torch height adjustment pin 208d, which can be separated by the first insulative blade 214, can be about 0.12 inches, and the arc length distance 314 between the torch height adjustment pin 208d and the control signal pin 208e, which can be separated by the second insulative blade 216, can be about 0.24 inches. Thus, the shortest arc length distance between the pilot carrying zones 210 and the residual zone is about 0.36 inches. These differential spacing schemes facilitate insulation between pins and signals.

In some embodiments, each of the pins 208 can be located at a radius 306 of between about 0.4 inches and about 0.65 inches from the center of 206 of the radial plane 202 of the base portion 200, such as about 0.55 inches. The radius 306 is defined as the distance between the center 206 of the radial plane 202 and the center of a pin 208. In some embodiments, each pin 208 is dimensioned to have a diameter of about 0.012 inches, such that an inner radius 308 between the center 206 of the radial plane 202 and the inner diameter of the pin 208 is about 0.49 inches, and an outer radius 310 between the center 206 of the radial plane 202 and the outer diameter of the pin 208 is about 0.61 inches. In some embodiments, wires attached to the pins 208 have different diameters, even though the pins 208 themselves have about the same diameter. For example, wires connected to the high current pilot carrying pins in zone 210 can have a larger diameter than that of wires connected to the low current control signal pins in zone 212.

Figure 4:
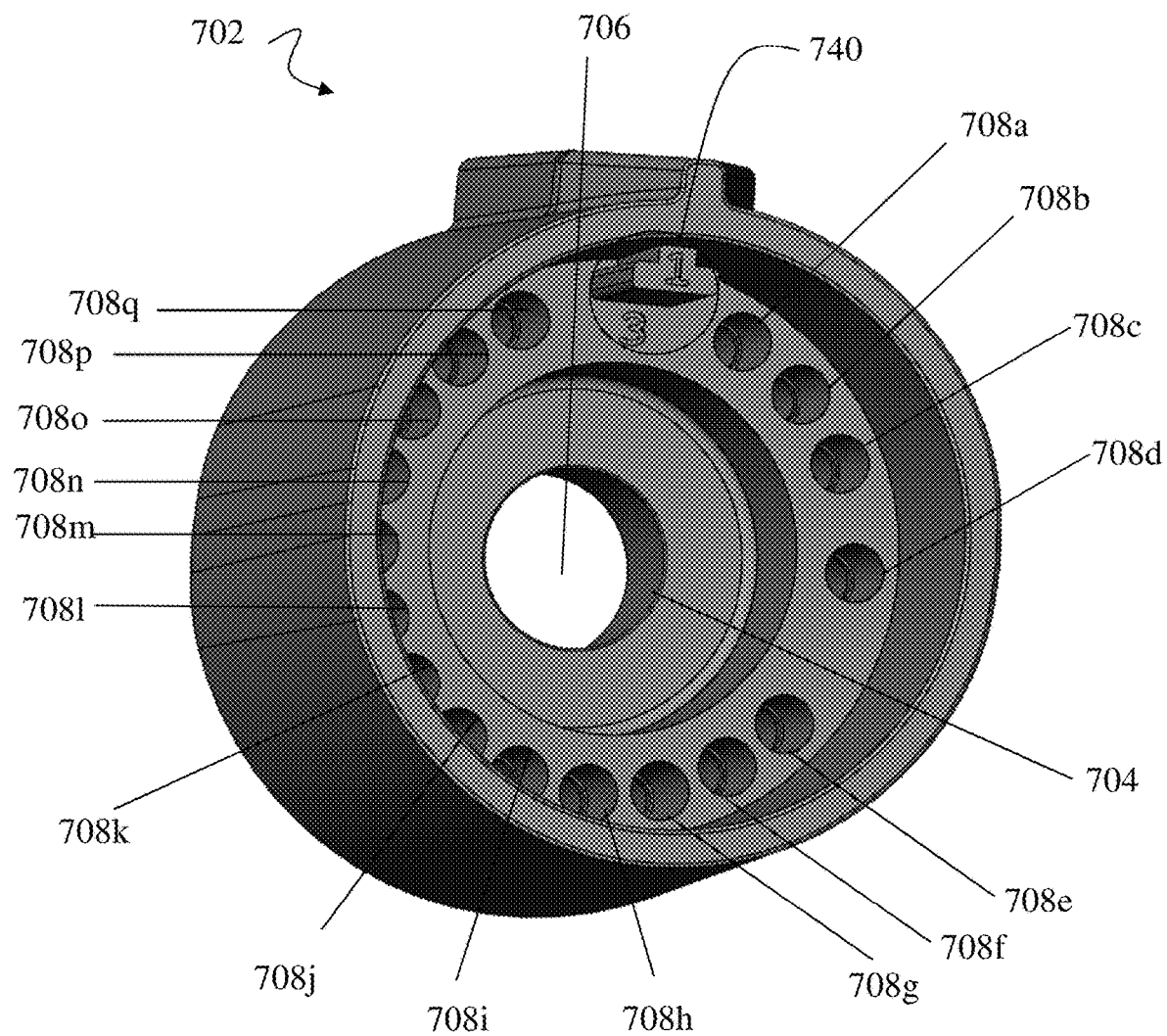
FIG. 4 shows a perspective view of the proximal end of an exemplary lead connector without insulative blades, according to some embodiments of the present invention.

FIG. 4 shows a perspective view of the proximal end of an exemplary lead connector 702 without insulative blades, according to some embodiments of the present invention. As shown, the lead connector 702 have the same set of pins 708 as the pins 208 of the lead connector 102, where the pins 708 are disposed in a the same order and at about the same angular locations about the center 706 of the central conduit opening 704. Specifically, the pins 708 (listed in a clockwise order relative to the one or more key feature 740) comprise a zone of pilot carrying pins 708a-c, a torch height adjustment pin 708d, a zone of control signal pins 708e-g, a zone of data communication pins 708h-j, a torch identification pin 708k, a zone of length identification pin 708l-n, and a zone of spare communication signal pins 708o-q. In some embodiments, the only difference between the lead connector 702 and the lead connector 102 is the absence of the insulative blades 214, 216 in the lead connector 702. However, the lead connector 702 can still achieve reduced creepage distance among the pins 708 without the use of an insulative blade while maximizing the number of pins that can fit on its radial plane due to the non-uniform spacing of the pins 708 as explained above with respect to FIGS. 2a, 2b and 3.

Figure 5:
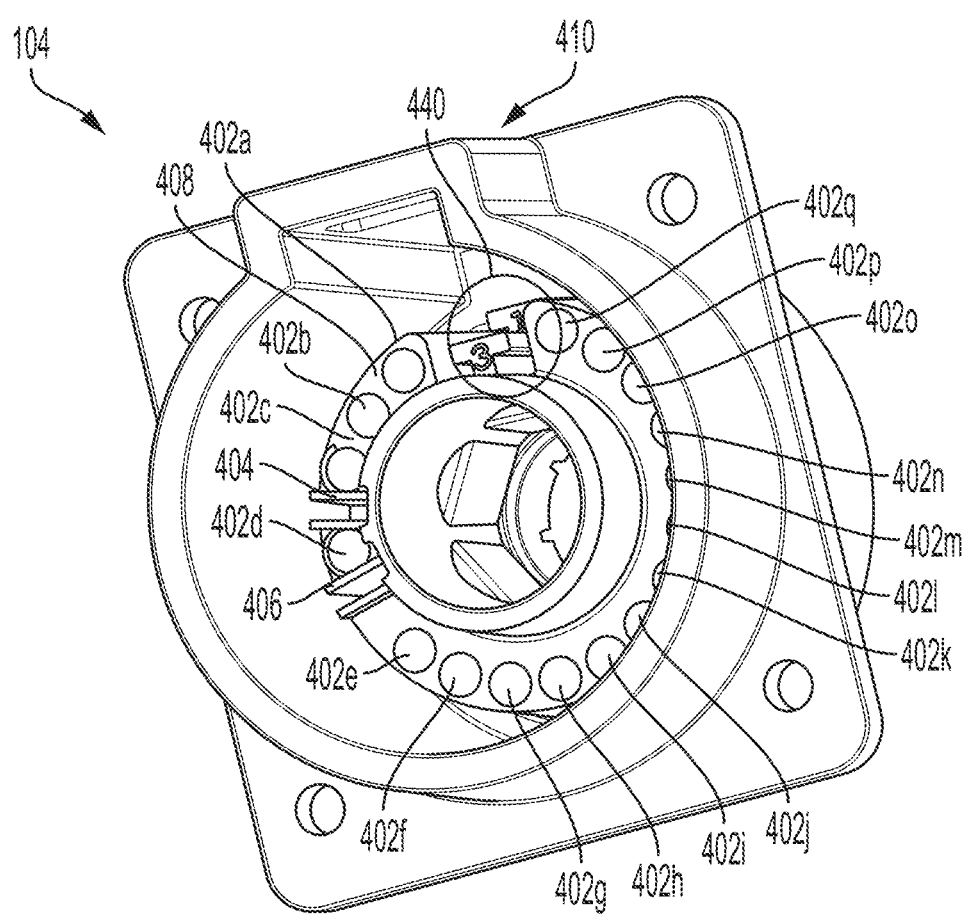
FIG. 5 shows a perspective view of the connector receptacle of the connector assembly of FIG. 1, according to some embodiments of the present invention.

As described above, the lead connector 102 of the connector assembly 100 is configured to matingly engage with the corresponding connector receptacle 104 for connecting the torch to the power/gas supply 110. Thus, the connector receptacle 104 has a set of orientation and insulation features complementary to the features of the lead connector 102. FIG. 5 shows a perspective view of the connector receptacle 104 of the connector assembly of FIG. 1, according to some embodiments of the present invention. As shown, the connector receptacle 104 includes multiple slots (collectively numbered 402) disposed on a radial plane 408 at its proximal end 410 for receiving the corresponding pins 208 of the lead connector 102. Specifically, the slots 402 include (i) a set of pilot carrying slots 402a-c for receiving the corresponding pilot carrying pins 208a-c, (ii) a torch height adjustment slot 402d for receiving the corresponding torch height adjustment pin 208d, (iii) a set of control signal slots 402e-g for receiving the corresponding control signal pins 208e-g, (iv) a set of data communication slots 402h-j for receiving the corresponding data communication pins 208h-j, (v) a torch identification slot 402k for receiving the corresponding torch identification pin 208k, (vi) a set of length identification slots 402l-n for receiving the corresponding length identification pins 208l-n, and (vii) a set of spare slots 402o-q for receiving the corresponding spare pins 208o-q. Further, the connector receptacle 104 includes a set of blade channels 404, 406 for receiving at least a portion of the insulative blades 214, 216, respectively of the lead connector 102.

In another aspect, the lead connector 102 and the connector receptacle 104 include one or more complementary key features to ensure that only acceptable torches can be connected to the power/gas supply 110. In some embodiments, the key features include a set of one or more steps 240 disposed relative to the radial plane 202 of the leader connector 102, as shown in FIGS. 2a and 2b, and a set of one or more complementary steps 440 disposed at about the same radial location on the proximal end 410 of the connector receptacle 104, as shown in FIG. 5. The key features 240, 440 can be disposed at about 0 degrees about the center of the respective radial planes. In general, the key features 440 on the connector receptacle have unique shapes and/or arrangements for a desired current rating (e.g., 30 A, 45 A, 65 A, 85 A, 105 A or 125 A) for the associated power supply 110, where the shapes and/or arrangements are different from those of a connector receptacle associated with a different current rating. Thus, a connector receptacle 104 can only engage with a particular lead connector 102 if the key features 240 of that lead connector 102 have complementary shapes and/or arrangements to indicate that the torch connected thereto is suitable for use under the desired current rating. As an example, a 30 A torch is associated with key features 240 on its torch connector 102 that do not complement the key features 440 of a connector receptacle 440 associate with a 125 A power supply, and therefore would not be able to connect to the more powerful power supply.

In some embodiments, the key features 440 of the connector receptacle 104 comprise multiple axial steps with staggered depths along the longitudinal axis of the receptacle 104, as shown in FIG. 5. The axial length of each step can be unique to a particular current rating. Further, the key features 440 can be labeled for user identification and reference during connection. For example, the "3-1" label for the two axial steps of FIG. 5 represents an index indicating the current rating of the associated power supply 110. In some embodiments, the label is unique to a particular current rating, e.g., 105A. Similarly, the key features 240 of the corresponding lead connector 102 also comprise multiple complementary axial steps with staggered depths of the same axial lengths along the longitudinal axis, as shown in FIGS. 2a and 2b. Further, the axial steps 240 can have the same label as those of the connector receptacle 104 to visually indicate to an operator that the connector 102 and the receptacle 104 are keyed to each other. In some embodiments, the axial steps 240 of the lead connector 102 can have different labels than those of the axial steps 440 of the connector receptacle 104, but can still mate with the axial steps of the connector receptacle 104, as long as the labels of the lead connector 102 indicate a current rating that is higher than the current rating of the connector receptacle 104.

Figure 6:
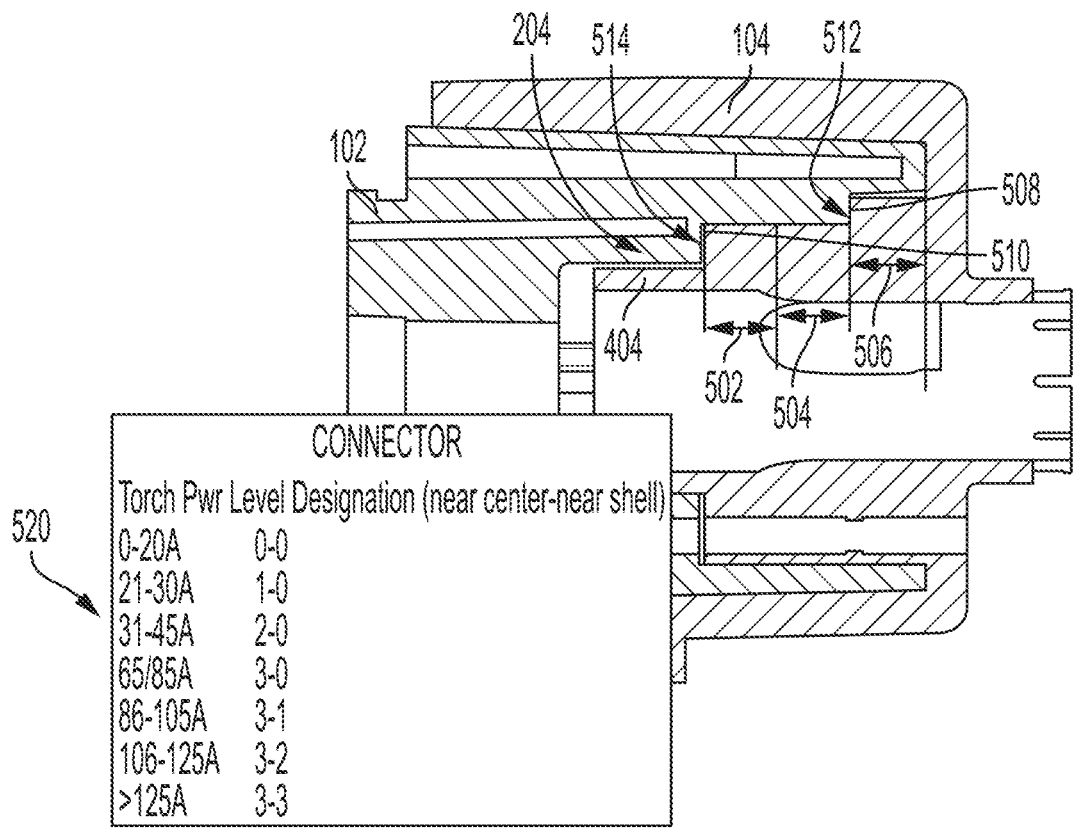
FIG. 6 shows a cross-sectional view of a portion of the connector assembly of FIG. 1 including the lead connector engaged to the connector receptacle, according to some embodiments of the present invention.

FIG. 6 shows a cross-sectional view of a portion of the connector assembly of FIG. 1 including the lead connector 102 engaged to the connector receptacle 104, according to some embodiments of the present invention. As shown, the key feature 440 of the connector receptacle 104 comprises two steps axially protruding or recessed relative the radial plane 408 on which the openings of the slots 402 are located. These axial steps have three axial lengths 502, 504, 506 that are specific to a particular current rating of the power supply 110. The suitable torch for the power supply 110 has a lead connector 102 with a key feature 240 that also comprises two complementary axial steps having the same three axial lengths 502, 504, 506. An additional or alternative protection mechanism includes each of the key features 240, 440 being labeled to visually identify the suitable current rating. For example, the key feature 440 of the connector receptacle 104 can have a set of one or more numbers etched on the tabs 508, 510 of the axial steps, where the numbers correspond to a particular current rating. Similarly, the key feature 240 of the complementary lead connector 102 can have a second set of numbers etched on the tabs 512, 514 of its axial steps. In some embodiments, the second set of numbers of the lead connector 102 corresponds to a current rating that is the same as or higher than the current rating associated with the set of numbers for the connector receptacle 104. This is to prevent a lower amperage torch from being connected into a higher amperage rated power supply to avoid over-heating of the torch leads or causing other damage due to such a faulty connection. For example, a "2-0" torch (e.g., a 3 1-45 A rated torch) can't be plugged into a "3-0" power supply (e.g., a 65 A or 85 A power supply system). However, a "3-0" torch can be plugged to a "2-0" power supply. FIG. 6 also shows a table 520 of exemplary indices mapped to different current ratings.

Figure 7:
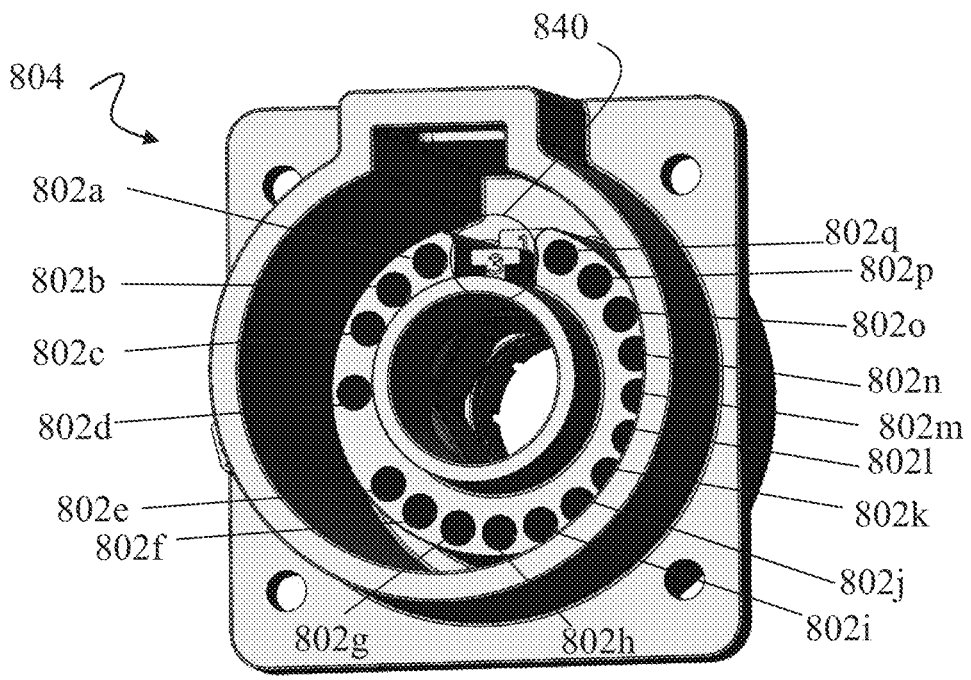
FIG. 7 shows a perspective view of another exemplary connector receptacle configured to matingly engage the lead connector of FIG. 4, according to some embodiments of the present invention.

FIG. 7 shows a perspective view of another exemplary connector receptacle 804 configured to matingly engage the lead connector 702 of FIG. 4, according to some embodiments of the present invention. As shown, the connector receptacle 804 includes multiple slots 802 for receiving the corresponding pins 708 of the lead connector 702. Specifically, the slots 802 include (i) a set of pilot carrying slots 802a-c for receiving the corresponding pilot carrying pins 708a-c, (ii) a torch height adjustment slot 802d for receiving the corresponding torch height adjustment pin 708d, (iii) a set of control signal slots 802e-g for receiving the corresponding control signal pins 708e-g, (iv) a set of data communication slots 802h-j for receiving the corresponding data communication pins 708h-j, (v) a torch identification slot 802k for receiving the corresponding torch identification pin 708k, (vi) a set of length identification slots 802l-n for receiving the corresponding length identification pins 708l-n, and (vii) a set of spare slots 802o-q for receiving the corresponding spare pins 708o-q. The connector receptacle 804, however, does not include any blade channel due to the absence of insulative blades in the corresponding lead connector 702. In some embodiments, the key features 740 of the lead connector 702 complement the key features 840 of the lead receptacle 804 in the same fashion as the key features 240, 440 of the lead connector 102 and lead receptacle 104 described above, for the purpose of ensuring that only acceptable torches can be connected to the power/gas supply 110. In some embodiments, the only difference between the lead receptacle 804 and the lead receptacle 104 is the absence of the blade channels 404, 406 in the lead receptacle 804.

FIG. 8 shows an exemplary method 600 for manufacturing the lead connector 102 of the connector assembly 100 of FIG. 1, according to some embodiments of the present invention. At step 602, the method 600 involves disposing one or more current carrying pins 208a-c radially about 0 degrees to about 90 degrees around the center 206 of the central conduit opening 204 on the radial plane 202 at the base portion 200 of the lead connector 102. The pilot carrying pins 208a-c, which form the pilot carrying zone 210, are configured to carry a pilot current from the power/gas supply 110 to the plasma arc torch attached to the lead connector 102. At step 604, one or more remaining pins are radially disposed at about 90 degrees to about 360 degrees about the center 206 of the central conduit opening 204 on the radial plane 202. These remaining pins can include the torch height adjustment pin 208d and a residual zone of pins 208e-q, which can be further divided into several zones including the control signal zone 212 encompassing pins 208e-208g, the data communication zone 222 encompassing pins 208h-j, and the length identification zone 224 encompassing pins 208l-n. These pins include at least the start pin 208f configured to generate a start signal for operating the torch. At step 606, the pins 208 are radially spaced in a non-uniform fashion such that the arc length distance among the pins of one zone is different from the arc length distance among the pins of another zone. For example, the arc length distance between a pair of the pilot carrying pins in the zone 210 is greater than the arc length distance between a pair of the pins in the residual zone. In some embodiments, one or more insulative blades are inserted between the pilot carrying pins 208a-c in the zone 210 and the torch height adjustment pin 208d and/or between the torch height adjustment pin 208d and the pins 208e-q in the residual zone to maximize creepage distance without increasing the arc length distance among the pins 208. As understood by a person of ordinary skill in the art, a similar method can be adapted for manufacturing the lead connector 702 of FIG. 4, according to some embodiments of the present invention.

In general, the connection and disconnection between the lead connector 102 and the connector receptacle 104 is quick and only involves an actuating motion for inserting the pins 208 into or retracting the pins 208 from the slots 402 while maintaining alignment of the key features 240, 440. The same advantage also applies to the lead connector 702 and the connector receptacle 804. Other advantages associated with the connector designs of the present invention include maximization of creepage distance among the communication ports while minimizing the size of the connector assembly, reduced interference in the lead due to strategic grouping and non-uniform placement of the communication ports, and improved safety by preventing any connection between a mismatched torch and power supply.

Within the context of the present invention, the term "about" in relation to a particular degree value can be constructed as covering a range of ±four-degree deviation from the particular degree value. The term "about" in relation to a numerical value can be constructed as covering a range of ±2% deviation from the particular numerical value. It should be understood that various aspects and embodiments of the invention can be combined in various ways. Based on the teachings of this specification, a person of ordinary skill in the art can readily determine how to combine these various embodiments. Modifications may also occur to those skilled in the art upon reading the specification.

What is claimed is:

1. A lead connector for connecting a plasma torch lead of a plasma arc torch to a power supply of a plasma cutting system, the lead connector comprising:
  a base portion;
  a central conduit disposed in the base portion, the central conduit configured to carry a gas and a torch current to the plasma arc torch; and
  a plurality of pins disposed radially about a center of the central conduit, the plurality of pins located at a radius of between about 0.4 inches and about 0.65 inches from the center of the central conduit on a radial plane of the base portion, the plurality of pins including:
    one or more pilot carrying pins configured to carry a pilot current to the plasma arc torch, the one or more pilot carrying pins located from about 27 degrees to about 64 degrees about the center of the central conduit on the radial plane; and
    a plurality of control signal pins radially disposed from about 120 degrees to about 170 degrees about the center of the central conduit on the radial plane, the plurality of control signal pins including (i) a power pin configured to provide power to a control board of the plasma arc torch and (ii) at least one of a start pin configured to generate a start signal for operating the torch or a consumable sensing pin configured to generate a detection signal for sensing installation of a consumable in the torch;
    wherein an angular spacing between each of the pilot carrying pins and a closest of the control signal pins is about 66 degrees or greater such that a current creepage is reduced between the pilot carrying pins and the closest of the control signal pins.

2. The lead connector of claim 1, wherein a line of sight spacing between a pilot-carry pin and the closest of the control signal pins is about 0.6 inches.

3. The lead connector of claim 1, wherein the reduced current creepage is further achieved using at least one of a first insulative blade disposed at about 80 degrees or a second insulative blade disposed at about 95 degrees about the center of the central conduit on the radial plane.

4. The lead connector of claim 3, wherein the first or second insulative blade is located radially between a pilot carrying pin and a control signal pin.

5. The lead connector of claim 1, wherein the closest control signal pin comprises the consumable sensing pin.

6. The lead connector of claim 1, wherein each of the pilot carrying pins maintains an arc length distance of about 0.05 inches from an adjacent pilot carrying pin.

7. The lead connector of claim 6, wherein each of the control signal pins maintains an arc length distance of about 0.03 inches from an adjacent control signal pin.

8. The lead connector of claim 1, wherein an arc length between a pair of the pilot carrying pins is greater than an arc length between a pair of the control signal pins.

9. The lead connector of claim 1, wherein the plasma cutting system comprises an air cooled plasma cutting system.

10. The lead connector of claim 1, further comprising a key feature disposed at about 0 degrees about the center of the central conduit on the radial plane, the key feature configured to matingly engage a key feature of a corresponding connector of a plasma power supply.

11. The lead connector of claim 10, wherein the key feature comprises at least two axial steps of the base portion shaped to identify the corresponding connector of the power supply.

12. The lead connector of claim 1, wherein the plurality of pins further includes a plurality of data communication pins disposed radially from about 180 degrees to about 214 degrees about the opening of the central conduit on the radial plane, the plurality of data communication pins configured to communicate data between the plasma arc torch and the power supply.

13. The lead connector of claim 1, wherein the plurality of pins further includes an identification pin disposed radially at about 230 degrees about the opening of the central conduit on the radial plane, the identification pin configured to signal whether the torch is a mechanized torch or a handheld torch.

14. The lead connector of claim 1, wherein the plurality of pins further includes a plurality of length identification pins disposed radially from about 240 to about 300 degrees about the opening of the central conduit on the radial plane, the plurality of length identification pins configured to signal to the power supply a length of the plasma torch lead.

15. The lead connector of claim 1, wherein the plurality of pins are located at a radius of about 0.55 inches from the center of the central conduit on the radial plane.

16. The lead connector of claim 1, wherein the start pin is located about 147 degrees about the center of the central conduit on the radial plane.

17. The lead connector of claim 1, wherein the start pin is located between about 80 degrees and about 120 degrees from a closest of the pilot carrying pins.

18. The lead connector of claim 1, wherein the consumable sensing pin is located about 130 degrees about the center of the central conduit on the radial plane.

19. The lead connector of claim 1, wherein the one or more pilot carrying pins is located about 0 degrees to about 90 degrees about the center of the central conduit on the radial plane.

20. The lead connector of claim 1, wherein a smallest angular spacing between the one or more pilot carrying pins and the control signal pins is about 60 degrees.

21. The lead connector of claim 1, wherein a largest angular spacing between the one or more pilot carrying pins and the control signal pins is about 140 degrees.

22. A lead connector for connecting a plasma torch lead of a plasma arc torch to a power supply of a plasma cutting system, the lead connector comprising:
a base portion;
a central conduit disposed in the base portion, the central conduit configured to carry a gas and a torch current to the plasma arc torch; and
a plurality of pins disposed radially about a center of the central conduit, the plurality of pins located at a radius of between about 0.4 inches and about 0.65 inches from the center of the central conduit on a radial plane of the base portion, the plurality of pins including:
one or more pilot carrying pins radially disposed at the radius about the center of the central conduit on the radial plane, the one or more pilot carrying pins configured to carry a pilot current to the plasma arc torch; and
a plurality of control signal pins radially disposed at the radius about the center of the central conduit on the radial plane, the plurality of control signal pins including a power pin configured to provide power to a control board of the plasma arc torch and a start pin for generating a start signal to operate the torch,
wherein an angular spacing between a pilot carrying pin and a closest of the control signal pins is not more than about 103 degrees when measured with respect to the central conduit, while a creepage distance between the pilot carrying pin and the closest control signal pin is greater than or equal to about 12.6 mm.

23. The lead connector of claim 22, further comprising one or more insulative blades radially disposed between the one or more pilot carrying pins and the control signal pins about the center of the central conduit on the radial plane.

24. The lead connector of claim 22, wherein each of the one or more pilot carrying pins maintains an arc length distance of about 0.046 inches from an adjacent pilot carrying pin.

25. The lead connector of claim 22, wherein each of the control signal pins maintains an arc length distance of about 0.03 inches from an adjacent control signal pin.

26. The lead connector of claim 22, wherein the one or more pilot carrying pins are located from about 20 degrees to about 70 degrees about the center of the conduit on the radial plane and the control signal pins are located from about 120 degrees to about 170 degrees about the center of the conduit on the radial plane.

27. The lead connector of claim 26, further comprising a key feature disposed at about 0 degrees about the center of the central conduit on the radial plane, the key feature configured to matingly engage a key feature of a corresponding connector of a plasma power supply.

28. A connector for a plasma cutting system including a plasma power supply and a plasma arc torch, the connector comprising:
a base portion;
a central conduit disposed in the base portion, the central conduit configured to carry a gas and a torch current to the plasma arc torch of the plasma cutting system;
a plurality of pins disposed radially about the central conduit on a radial plane of the base portion, the plurality of pins divided into a set of distinct circumferential zones about the central conduit, the set of distinct circumferential zones including:
a first zone located in a first quadrant on the radial plane of the base portion, the first zone including a plurality of pins comprising one or more pilot carrying pins configured to conduct a pilot current to the plasma arc torch; and
a second zone located in a second through a fourth quadrant on the radial plane of the base portion, the second zone including a plurality of pins comprising a start pin configured to generate a start signal for operating the torch, wherein a distance between a pair of the pins in the first zone is greater than a distance between a pair of the pins in the second zone.

29. The connector of claim 28, wherein each of a first pin and a last pin of the second zone is spaced radially at least 0.3 inches in arc length from respective adjacent pins of the first zone.

30. The connector of claim 28, further includes a means for insulating the pins in the second zone from the one or more pilot carrying pins in the first zone to decrease a current creepage from the pilot carrying pins to the pins in the second zone.

31. A method of manufacturing a connector for a plasma cutting system, the connector comprising a base portion and a central conduit disposed in the base portion for carrying a gas and a torch current to a plasma arc torch of the plasma cutting system, the method comprising:
   disposing a plurality of pilot carrying pins radially at about 0 degrees to about 90 degrees about a center of the central conduit on a radial plane of the base portion, the pilot carrying pins configured to carry a pilot current to the plasma arc torch;
   disposing a plurality of remaining pins radially at about 90 degrees to about 360 degrees about the center of the central conduit on the radial plane of the base portion, the remaining pins including a start pin configured to generate a start signal for operating the torch; and
   radially spacing the pilot carrying pins and the remaining pins such that a distance between a pair of the pilot carrying pins is greater than a distance between a pair of the remaining pins.

32. The method of claim 31, further comprising inserting one or more insulative blades between the pilot carrying pins and the remaining pins to reduce creepage of the pilot current from the pilot carrying pins to the remaining pins.

33. The method of claim 31, further comprising disposing each of the pilot carrying pins and the remaining pins at a radius of between about 0.4 inches and about 0.65 inches from the center of the central conduit on the radial plane of the base portion.

34. A lead connector for connecting a plasma torch lead of a plasma arc torch to a power supply of a plasma cutting system, the lead connector comprising:
   a base portion;
   a central conduit disposed in the base portion, the central conduit configured to carry a gas and a torch current to the plasma arc torch;
   a plurality of pins disposed radially about a center of the central conduit, the plurality of pins located at a radius of between about 0.4 inches and about 0.65 inches from the center of the central conduit on a radial plane of the base portion, the plurality of pins including:
      one or more pilot carrying pins configured to carry a pilot current to the plasma arc torch, the one or more pilot carrying pins located from about 27 degrees to about 64 degrees about the center of the central conduit on the radial plane; and
      one or more control signal pins radially disposed form about 120 degrees to about 170 degrees about the center of the central conduiit on the radial plane, the one or more of control signal pins including at least one of a start pin configured to generate a start signal for operating the torch or a consumable sensing pin configured to generate a detection signal for sensing installation of a consumable in the torch;
   wherein an angular spacing between each of the pilot carrying pins and a closest of the control signal pins is about 66 degrees or greater such that a current creepage is reduced between the pilot carrying pins and the closest of the control signal pins, and
   at least one of a first insulative blade disposed at about 80 degrees or a second insulative blade disposed at about 95 degrees about the center of the central conduit on the radial plane to further reduce the current creepage.

35. The lead connector of claim 34, wherein the first or second insulative blade is located radially between a pilot carrying pin and a control signal pin.

36. A lead connector for connecting a plasma torch lead of a plasma arc torch to a power supply of a plasma cutting system, the lead connector comprising:
   a base portion;
   a central conduit disposed in the base portion, the central conduit configured to carry a gas and a torch current to the plasma arc torch;
   a plurality of pins disposed radially about a center of the central conduit, the plurality of pins located at a radius of between about 0.4 inches and about 0.65 inches from the center of the central conduit on a radial plane of the base portion, the plurality of pins including:
      one or more pilot carrying pins radially disposed at the radius about the center of the central conduit on the radial plane, the one or more pilot carrying pins configured to carry a pilot current to the plasma arc torch; and
      one or more control signal pins radially disposed at the radius about the center of the central conduit on the radial plane, the one or more control signal pins including a start pin for generating a start signal to operate the torch,
   wherein an angular spacing between a pilot carrying pin and a closest of the control signal pins is not more than about 103 degrees when measured with respect to the central conduit, while a creepage distance between the pilot carrying pin and the closest control signal pin is greater than or equal to about 12.6 mm; and
   one or more insulative blades radially disposed between the one or more pilot carrying pins and the one or more control signal pins about the center of the central condujit on the radial plane.

* * * * *

UNITED STATES PATENT AND TRADEMARK OFFICE
CERTIFICATE OF CORRECTION

| | | |
|---|---|---|
| PATENT NO. | : 12,114,413 B2 | Page 1 of 1 |
| APPLICATION NO. | : 16/567432 | |
| DATED | : October 8, 2024 | |
| INVENTOR(S) | : Jing Wu et al. | |

It is certified that error appears in the above-identified patent and that said Letters Patent is hereby corrected as shown below:

In the Claims

Claim 34:
Column 18, Line 3 reads:
"one or more control signal pins radially disposed form"
Should read:
--one or more control signal pins radially disposed from--

Claim 34:
Column 18, Line 5 reads:
"center of the central conduiit on the radial plane, the"
Should read:
--center of the central conduit on the radial plane, the--

Claim 36:
Column 18, Line 54 reads:
"condujit on the radial plane."
Should read:
--conduit on the radial plane.--

Signed and Sealed this
Fourth Day of March, 2025

Coke Morgan Stewart
*Acting Director of the United States Patent and Trademark Office*